(12) United States Patent
Leininger

(10) Patent No.: US 8,985,912 B2
(45) Date of Patent: Mar. 24, 2015

(54) BACK MIXING DEVICE FOR PNEUMATIC CONVEYING SYSTEMS

(71) Applicant: General Electric Company, Schenectady, NY (US)

(72) Inventor: Thomas Frederick Leininger, Chino Hills, CA (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 14/458,492

(22) Filed: Aug. 13, 2014

(65) Prior Publication Data
US 2014/0348598 A1 Nov. 27, 2014

Related U.S. Application Data

(62) Division of application No. 12/915,553, filed on Oct. 29, 2010, now Pat. No. 8,834,074.

(51) Int. Cl.
*B65G 53/52* (2006.01)
*B65G 53/16* (2006.01)

(52) U.S. Cl.
CPC ................................. *B65G 53/16* (2013.01)
USPC ............... 406/92; 406/52; 406/71; 406/93; 406/122; 406/144; 110/104 R; 48/77

(58) Field of Classification Search
USPC .................. 406/52, 71, 92, 93, 122, 144; 110/104 R; 48/77
See application file for complete search history.

(56) References Cited

U.S. PATENT DOCUMENTS

| | | | |
|---|---|---|---|
| 2,023,696 A | 12/1935 | Porteous |
| 3,599,832 A | 8/1971 | Smith |
| 3,826,474 A | 7/1974 | Pareja |
| 4,007,969 A | 2/1977 | Aubin et al. |
| 4,232,829 A | 11/1980 | Gruber |
| 4,250,816 A | 2/1981 | Angevine et al. |
| 4,479,442 A | 10/1984 | Itse et al. |
| 4,611,759 A | 9/1986 | Cox |
| 4,750,437 A | 6/1988 | Rouse |
| 5,071,289 A | 12/1991 | Spivak |
| 5,165,226 A | 11/1992 | Newton et al. |
| 5,350,260 A | 9/1994 | Hollrock et al. |
| 5,409,610 A | 4/1995 | Clark |

(Continued)

FOREIGN PATENT DOCUMENTS

CN 2703967 Y 6/2005
CN 201488507 A 5/2010

(Continued)

OTHER PUBLICATIONS

English language translation of Chinese Office Action dated Aug. 26, 2014 for Application No. CN 201180052781.3.

*Primary Examiner* — Joseph Dillon, Jr.
(74) *Attorney, Agent, or Firm* — Sutherland Asbill & Brennan LLP

(57) ABSTRACT

The present application provides a back mixing device for use with a pneumatically conveyed flow of solids having a varying flow rate. The back mixing device may include a nozzle, a chamber in communication with the nozzle, and an exit. The chamber may include an expanded area leading to a restriction such that the chamber creates a recirculation pattern in the flow of solids so as to smooth the varying flow rate though the back mixing device.

6 Claims, 5 Drawing Sheets

(56) References Cited

U.S. PATENT DOCUMENTS

| | | |
|---|---|---|
| 5,795,060 A | 8/1998 | Stephens |
| 5,810,934 A | 9/1998 | Lord et al. |
| 5,816,041 A | 10/1998 | Greninger |
| 5,829,368 A | 11/1998 | Cote et al. |
| 6,213,289 B1 | 4/2001 | Hay et al. |
| 6,293,208 B1 | 9/2001 | Guiot et al. |
| 6,974,279 B2 | 12/2005 | Morohashi et al. |
| 7,311,474 B1 | 12/2007 | Ogasahara et al. |
| 7,402,188 B2 * | 7/2008 | Sprouse .................... 48/77 |
| 7,607,972 B2 | 10/2009 | Groman |
| 7,784,999 B1 | 8/2010 | Lott |
| 8,201,462 B2 | 6/2012 | Vaidya |
| 8,377,387 B2 | 2/2013 | Dinu et al. |
| 2002/0006591 A1 | 1/2002 | Hugens, Jr. |
| 2003/0232133 A1 | 12/2003 | Krysa et al. |
| 2005/0074303 A1 | 4/2005 | Morohashi et al. |
| 2005/0172659 A1 | 8/2005 | Barker et al. |
| 2007/0287126 A1 | 12/2007 | Groman |
| 2008/0148965 A1 | 6/2008 | Bravo et al. |
| 2009/0132148 A1 | 5/2009 | Burkhardt |
| 2009/0178338 A1 | 7/2009 | Leininger et al. |
| 2010/0086893 A1 | 4/2010 | Groman |
| 2010/0192583 A1 | 8/2010 | Cano Wolff et al. |
| 2010/0285413 A1 | 11/2010 | Borissov |
| 2011/0083516 A1 | 4/2011 | Vaidya |
| 2012/0006238 A1 | 1/2012 | Cheng et al. |
| 2013/0004378 A1 | 1/2013 | Luo et al. |
| 2013/0101955 A1 | 4/2013 | Broyles et al. |
| 2013/0145573 A1 | 6/2013 | Bizhanzadeh |
| 2013/0160275 A1 | 6/2013 | Groman |
| 2013/0161408 A1 | 6/2013 | Wurz |
| 2013/0299387 A1 | 11/2013 | Salazar et al. |

FOREIGN PATENT DOCUMENTS

| | | |
|---|---|---|
| CN | 101749724 A | 6/2010 |
| GB | 2096911 A | 10/1982 |
| WO | 01/25689 A1 | 4/2001 |
| WO | 2005/062892 A2 | 7/2005 |

* cited by examiner

BACK MIXING DEVICE FOR PNEUMATIC CONVEYING SYSTEMS

CROSS-REFERENCE TO RELATED APPLICATION

The present application is a divisional of and claims the benefit of and priority to U.S. patent application Ser. No. 12/915,553, filed Oct. 29, 2010, issued as U.S. Pat. No. 8,834,074, which is incorporated by reference herein in its entirety.

FIELD OF THE DISCLOSURE

The present application relates generally to pneumatic conveying systems and more particularly relates to an in-line back mixing device for producing a steady flow of solids in pneumatic conveying systems such as those used in gasification systems and the like.

BACKGROUND

Known integrated gasification combined cycle ("IGCC") power generation systems may include a gasification system that is integrated with at least one power producing turbine system. For example, known gasifiers may convert a mixture of a fuel such as coal with air or oxygen, steam, and other additives into an output of a partially combusted gas, typically referred to as synthesis gas or "syngas". These hot partially combusted gases typically are scrubbed using conventional technologies to remove contaminates and then supplied to a combustor of a gas turbine engine. The gas turbine engine, in turn, powers a generator for the production of electrical power or to drive another type of load. Exhaust from the gas turbine engine may be supplied to a heat recovery steam generator so as to generate steam for a steam turbine. The power generated by the steam turbine also may drive an electrical generator or another type of load. Similar types of power generation systems may be known.

These known gasification systems generally require a conveying system to deliver a relatively steady flow rate of coal to the gasifier to ensure consistent performance. One known type of conveying system is a pneumatic conveying system in which finely ground particles of coal are conveyed through a conduit to the gasifier using a flow of gas such as nitrogen, carbon dioxide, or natural gas as the transport medium or carrier gas. The flow rate of coal, or any other type of conveyed solids in a pneumatic conveying system, however, generally may exhibit varying fluctuations. These solids flow rate fluctuations may be a result of a flow separation between the solids and the carrier gas that can be caused by elements of the pneumatic conveying system itself. For example, sharp bends or changes in cross sectional area of the conduit may cause disruption in the movement of the solids relative to the movement of the gas. Such may lead to some regions of carrier gas that are enriched in solids and other regions that are depleted in solids. In such circumstances, a plot versus time of the flow rate of solids past a fixed point along the conduit may take the shape of an irregular wave form with the peaks representing regions of solids enriched carrier gas and the troughs representing regions of solids depleted gas. Flow rate fluctuations may also be caused by other elements of a pneumatic conveying system such as the solids pressurization equipment. Such equipment, by its very nature, may cause aggregation or agglomeration of particles that can give rise to pulses in solids concentration downstream of the pressurization device. Such an unsteady flow rate, as described above, may lead to poor gasifier control and hence poor gasifier performance in the form of lower carbon conversions and the like.

There is thus a desire for an improved pneumatic conveying system. Such an improved pneumatic conveying system may provide a steady flow rate of solids, such as coal, which in turn may provide improved overall gasifier performance and, hence, improved power plant performance.

SUMMARY

The present application thus provides a back mixing device for use with a flow of solids having a varying flow rate. The back mixing device may include a nozzle, a chamber in communication with the nozzle, and an exit. The chamber may include an expanded area leading to a restriction such that the chamber creates a recirculation pattern in the flow of solids so as to smooth the varying flow rate though the back mixing device.

The present application further provides a pneumatic conveying system for use with a gasification system. The pneumatic conveying system may include a source of coal, a solids feeder positioned downstream of the source of coal, a back mixing device positioned downstream of the solids feeder, and a gasifier.

These and other features and improvements of the present application will become apparent to one of ordinary skill in the art upon review of the following detailed description when taken in conjunction with the several drawings and the appended claims.

BRIEF DESCRIPTION OF THE DRAWINGS

FIG. 1 is a schematic view of a portion of pneumatic conveying system as may be described herein for use with a gasifier and the like.

DETAILED DESCRIPTION

Figure 1:
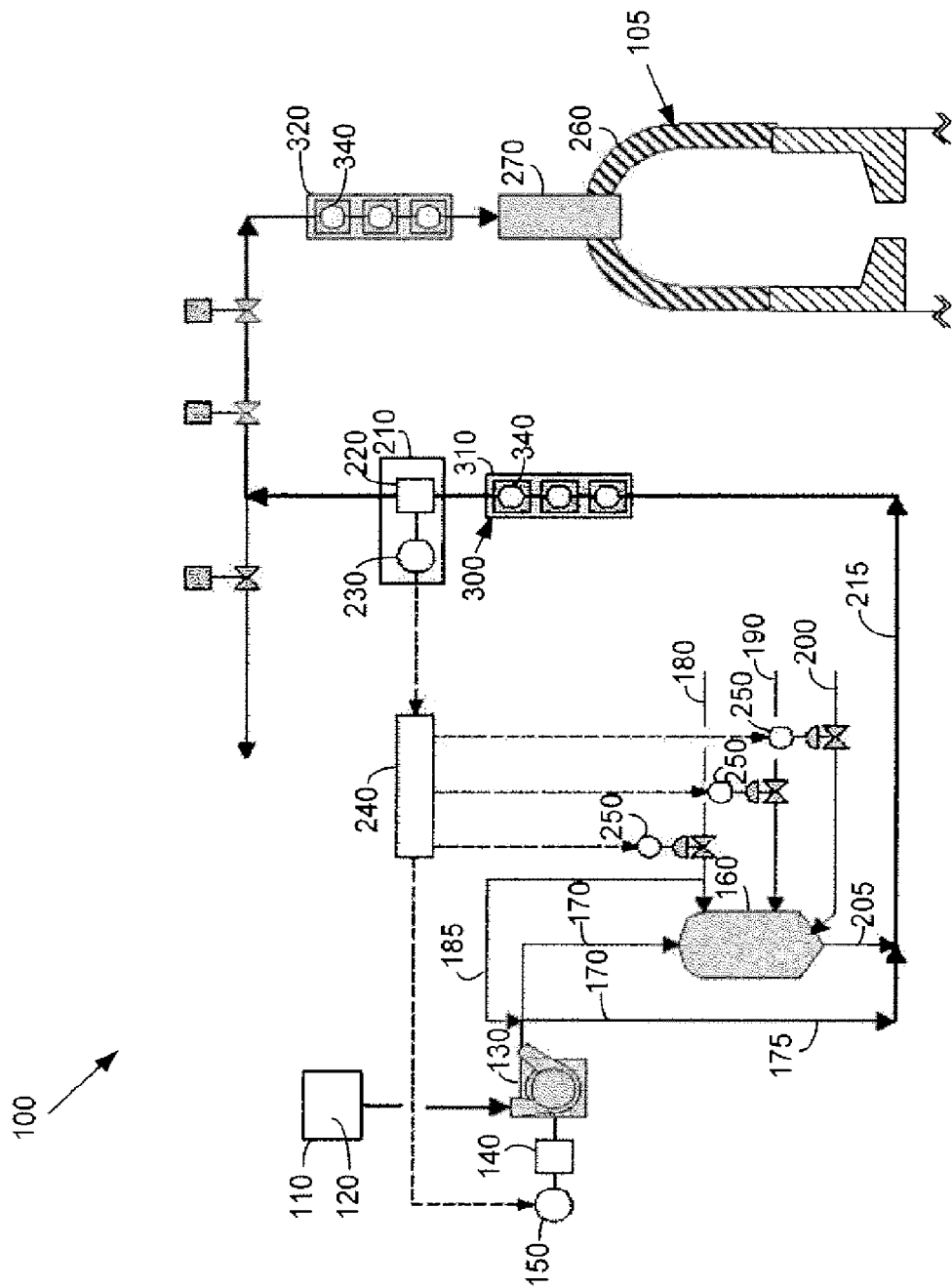

Referring now to the drawings, in which like numerals refer to like elements throughout the several views, FIG. 1 shows portions of a pneumatic conveying system 100 as may be described herein for use with at least a portion of a gasification system 105 and the like. The pneumatic conveying system 100 may include a coal source 110 with an amount of coal 120 therein. The coal source 110 may have any desired size or shape. Likewise, the coal source 110 may contain any type of coal, petroleum coke, solid biomass, other solid carbonaceous fuels, or mixtures thereof (all of which are referred to as "coal 120"). The coal 120 may be ground or otherwise prepared before use including being mixed with other ground particulate matter, such as non-carbonaceous mineral matter, that may be added to enhance the gasification characteristics of the coal in the gasifier.

The pneumatic conveying system 100 may include a solids feeder 130 positioned downstream of and in communication with the coal source 110. The solids feeder 130 may be a rotary, converging channel solids pressurizing and metering device such as the Posimetric® Feeder, a particulate solids feeding pump offered by the GE Energy Division of the General Electric Company of Schenectady, N.Y. Other types of feeders, solids pumps, or other types of conveyance devices may be used herein. In this embodiment, the solids feeder 130 may be driven by a motor 140 with a speed controller 150. The solids feeder 130 may pressurize solids from atmospheric pressure to pressures well over 1000 psig (about 70 kg/cm$^2$). Other configurations may be used herein.

The pneumatic conveying system 100 further may include a high pressure feed vessel 160 positioned downstream of the solids feeder 130. The high pressure feed vessel 160 mixes a flow of solids 170 from the solids feeder 130 with a flow of a conveying gas 180, a flow of a pressure control gas 190, and/or a flow of a fluidizing gas 200. The high pressure feed vessel 160 may be of conventional design. The high pressure feed vessel 160 fluidizes the flow of solids 170 and enhances the flow characteristics thereof. The flow of solids 170 may exit the high pressure feed vessel 160 via one or more discharge lines 205.

The high pressure feed vessel 160 serves as a buffer between the solids feeder 130 and a gasifier fuel injector as is described below. The high pressure feed vessel 160 is an alternative flow path that may be used to improve the flow of solids 170 in the pneumatic conveying system 100 particularly if the solids feeder 130 is not a Posimetric® feeder as is described above or a similar device. The flow of the conveying gas 180 may be used to channel the flow of the solids 170 out of the high pressure feed vessel 160 and into the discharge line 205 to the pneumatic conveying line 215. Flow control may be achieved by adjusting the operational speed of solids feeder 130 and by adjusting the flow rates of the conveying gas stream 180 channeled to the high pressure feed vessel 160. If the optional high pressure feed vessel 160 is not used, the flow of the conveying gas 180 may be routed via a line 185 to channel the flow of solids 170 directly from the exit of solids feeder 130 to the conveying line 215 via a bypass line 175. In that case, flow control may be achieved by adjusting the operational speed of the solids feeder 130 and by adjusting the flow rate of the conveying gas stream 180 channeled via the line 185 to the exit of solids feeder 130. Other configurations may be used herein.

The pneumatic conveying system 100 further may include a flow meter 210 positioned downstream of the solids feeder 130 and the high pressure feed vessel 160. The flow meter 210 may be of conventional design that is suitable for measuring the flow rate of pneumatically conveyed solids and may include a flow element 220, a flow transmitter 230, and/or other components. Other types of flow measurement devices may be used herein.

The output of the flow meter 210 may be communicated to a controller 240. The controller 240 may be any type of conventional microprocessor and the like. The controller 240 may be in communication with the speed controller 150 of the solids feeder 130 as well as a number of flow control valves 250 in communication with the flow of the conveying gas 180, the flow of the pressure control gas 190, and the flow of the fluidizing gas 200. The controller 240 controls the speed of the flow of solids 170 as may be desired. Any other type of control device may be used herein.

The pneumatic conveying system 100 also may include a gasifier 260, only a portion of which is shown. The gasifier 260 may be positioned downstream of the flow meter 210. The gasifier 260 may be of conventional design and may include a fuel injector 270 or other type of intake device. The flow of solids 170 conveyed to the gasifier 260 reacts with oxygen, water, and possibly other reactants to generate a syngas product via well known, controlled chemical reactions.

The pneumatic conveying system 100 also may include one or more back mixing devices 300. In this example, a first back mixing device 310 may be positioned upstream of the flow meter 210. The first back mixing device 310 may smooth the flow of solids 170 prior to the flow meter 210 so as to improve the control of the solids feeder 130 and the high pressure feed vessel 160, if used, via the controller 240. A second back mixing device 320 may be positioned upstream of the fuel injector 270 of the gasifier 260. The second back mixing device 320 may smooth any flow instabilities that develop between the flow meter 210 and the fuel injector 270 so as to insure a steady flow rate of solids 170 into and through the injector 270. Any number of back mixing devices 300 may be used herein with any type of flow of solids 170.

Figure 2:
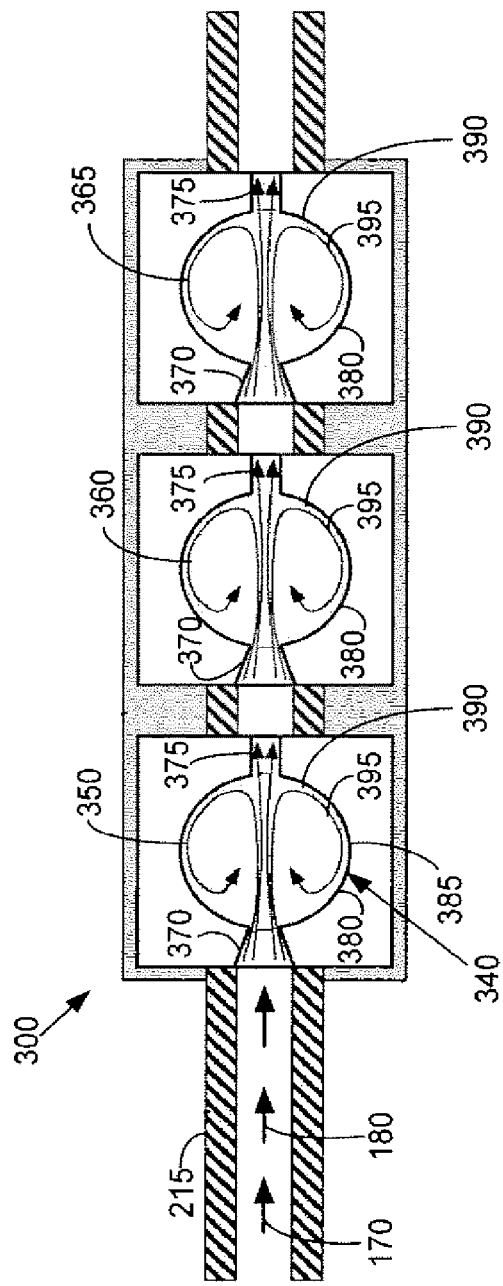
FIG. 2 is a side cross-sectional view of an in-line back mixing device as may be described herein.

FIG. 2 shows an embodiment of the back mixing device 300. As is shown, the back mixing device 300 may be positioned within the pneumatic conveying line 215 with the flow of solids 170 and the flow of the conveying gas 180 or other gases therein. The back mixing device 300 may include one or more back mixing chambers 340. In this example, a first back mixing chamber 350, a second back mixing chamber 360, and a third back mixing chamber 365 are shown although any number of the chambers 340 may be used.

Each back mixing chamber 340 may include a nozzle 370 on one end thereof and an exit 375 at the other. The chamber 340 may form an expanded area 380 about the nozzle 370 and a restriction 390 about the exit 375. Specifically in this embodiment, the nozzle 370 may have a constricting shape extending in the downstream direction while the chamber 340 may have a somewhat spherical shape 385 with the expanded area 380 leading to the restriction 390 before ending at the exit 375. Other shapes and configurations may be used herein. The mixing chambers 340 may have any size or volume.

The flow of solids 170 thus encounters a change in the cross-sectional area of the conveying line 215 as the flow is first constricted in the nozzle 370 and then expanded within the chamber 340 before encountering the restriction 390 and the exit 375. The change in cross-sectional area thus creates a number of recirculation patterns 395 that promote axial back mixing. This back mixing promotes stability in the flow rate of the solids 170 over time. Further stability is promoted via the use of the additional chambers 360, 365. The design of the back mixing device 300 thus may be optimized via combinations of the shape and volume of the chambers 340 as well as the number of chambers 340 and/or other parameters.

Figure 3:
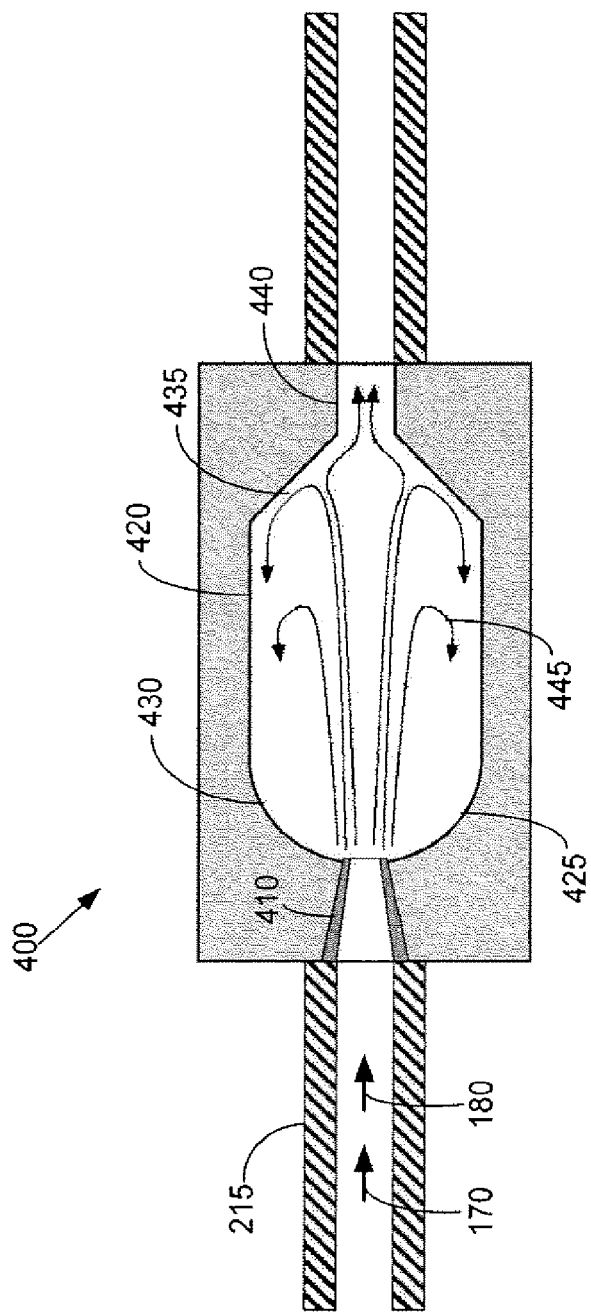
FIG. 3 is a side cross-sectional view of an alternative embodiment of the in-line back mixing device.

FIG. 3 shows an alternative embodiment of a back mixing device 400. In this embodiment, the back mixing device 400 may include a nozzle 410 leading to a chamber 420. The chamber 420 may have a largely cylindrical shape 425 with a hemispherically expanded area 430 that leads to a conical restriction 435 at an exit 440 thereof. The chamber 420 largely has the shape of a reaction chamber within the gasifier 260. The combination of the shape of the chamber 420 and the restriction 435 may develop a strong recirculation pattern 445 in the flow of solids 170 therein. Additional chambers 420 also may be used herein. As above, the design of the back mixing device 400 may be optimized via combinations of the shape and volume of the chambers 420 as well as the number of chambers 420. Similar designs may be used herein.

Figure 4:
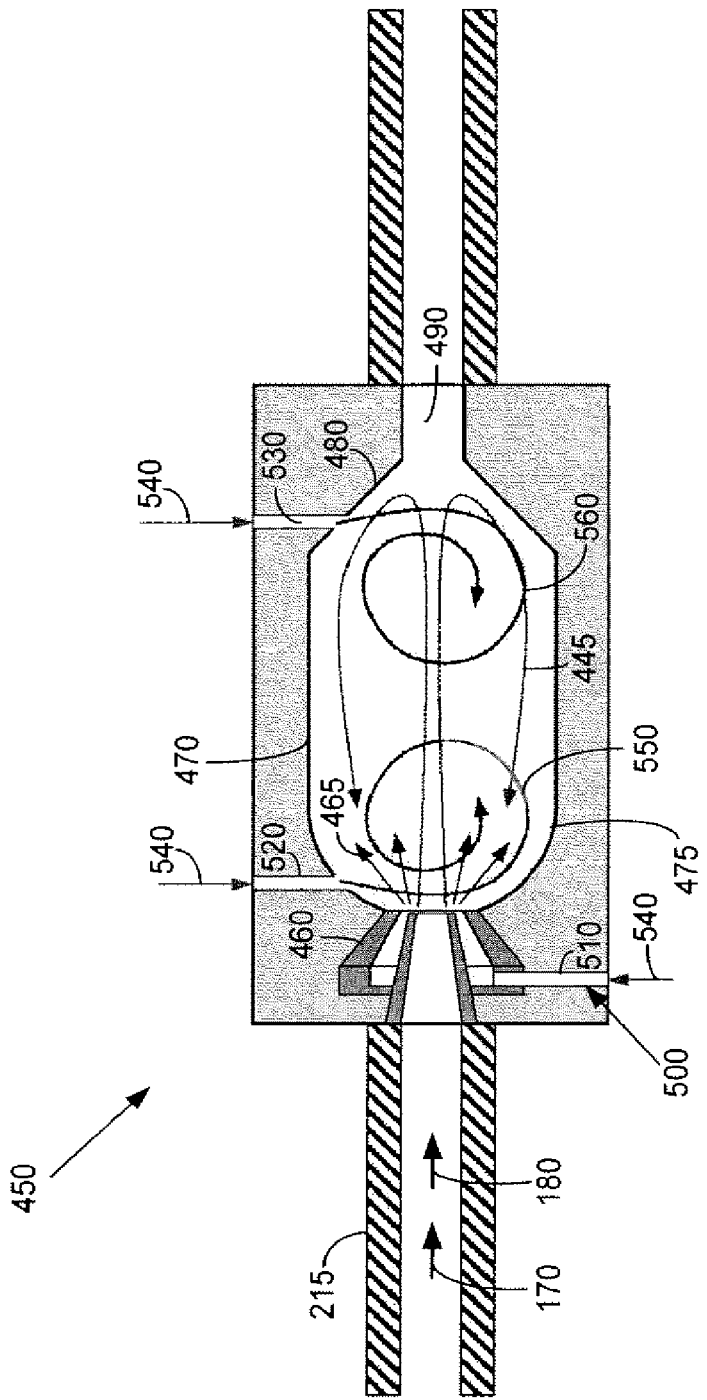
FIG. 4 is a side cross-sectional view of a further alternative embodiment of the in-line back mixing device.

FIG. 4 shows a further embodiment of a back mixing device 450. In this embodiment, the back mixing device 450 also may include a nozzle 460 leading to a chamber 470 with an expanded area 475 leading to a restriction 480 about an exit 490. The back mixing device 450 also may have one or more back mixing gas lines 500. The back mixing gas lines 500 may include a nozzle line 510, an upstream line 520, and/or a downstream line 530. One or more of the back mixing gas lines 500 may be used together.

As the flow of solids 170 is introduced into the nozzle 460 of the back mixing device 450, the nozzle line 510 also joins the nozzle 460 so as to disperse further the incoming flow of solids 170 into a dispersion pattern 465 with a flow of a back mixing gas 540 before and during entry into the chamber 470. With the use of the upstream line 520, the back mixing gas 540 may be introduced into the chamber 470 at an upstream end so as to create an upstream recirculation pattern 550. Likewise with the downstream line 530, the back mixing gas 540 may be introduced to a downstream portion of the chamber 470 to create a downstream recirculation pattern 560. Specifically, the back mixing gas 540 through the downstream line 530 may force the flow of solids 170 to deviate from the exit 490 and to recirculate within the chamber 470. Similar types of gas entry points and configurations may be used herein.

The back mixing devices 300 described herein thus provide flow stability for the flow of solids 170 leaving either the solids feeder 130 or the high pressure feed vessel 160. The back mixing devices 300 smooth out the unsteady flow rate by providing one or more chambers 340 to enhance axial back mixing therein. The chambers 340 may have many different shapes and configurations. Any type of solids flow may be used herein.

Figure 5:
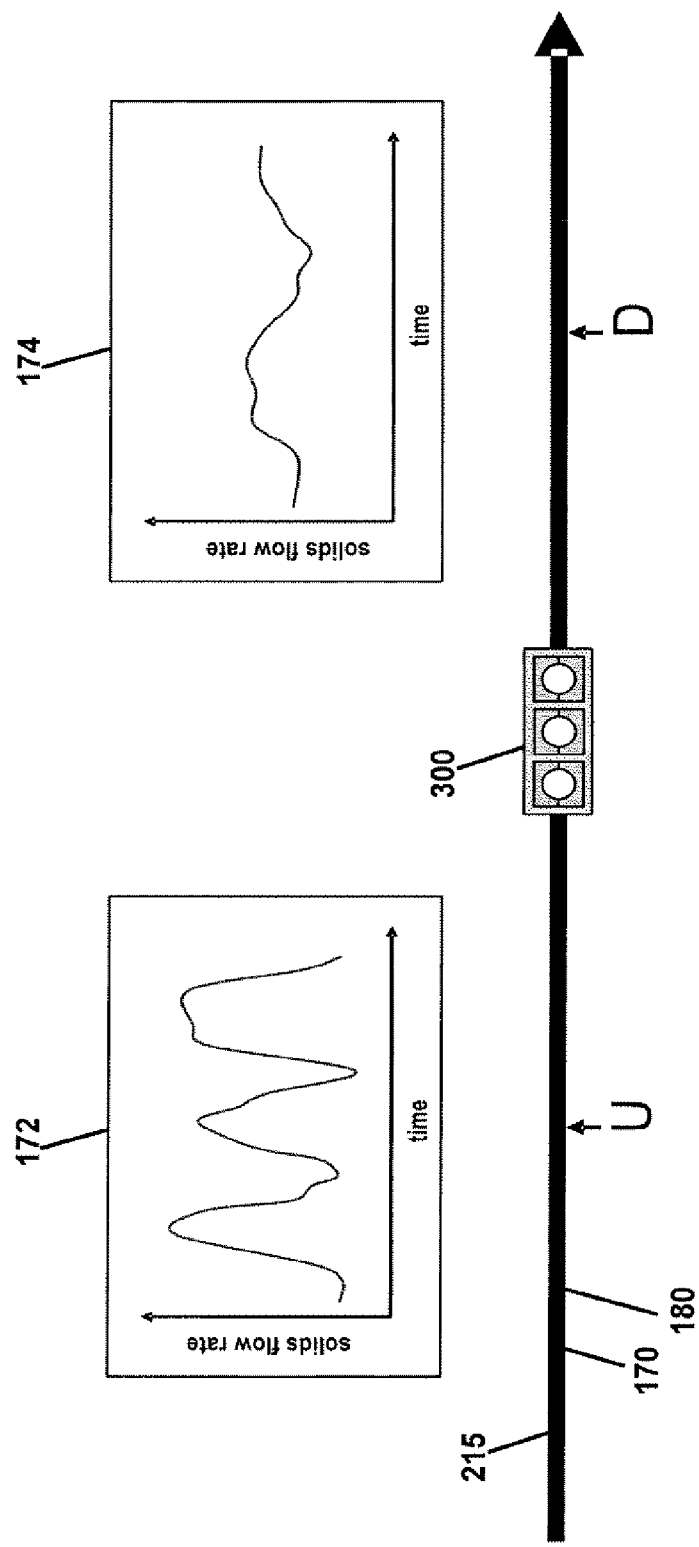
FIG. 5 is a schematic view of the effect that the in-line back mixing devices described herein may have upon the flow of solids when inserted in a conduit carrying the pneumatically conveyed solids.

FIG. 5 illustrates the effect that a back mixing device, as described herein, may generally have on the stability of the solids flow rate in a given pneumatic conveying system. A back mixing device 300 may be positioned within the pneumatic conveying line 215 having a flow of solids 170 and a flow of conveying gas 180 therein. The graph 172 shows the fluctuations over time in the flow of solids 170 at a point U upstream of the back mixing device 300. The irregular waveform represents the flow rate of solids carried by the conveying gas as it flows past point U, with the peaks representing solids enriched carrier gas and the troughs representing solids depleted gas. As described above, these fluctuations in solids flow may be caused by elements within the pneumatic conveying system itself The graph 174 is similar to graph 172, except that it shows the fluctuations in solids flow rate at a point D downstream of the back mixing device 300. At point D, both the magnitude and the frequency of the fluctuations in solids flow have decreased due to the effect of the solids back mixing device. As described herein, the recirculation patterns generated inside the back mixing device facilitate mixing between regions of solids enriched and solids depleted conveying gas. In doing so, the back mixing device averages or smoothes out the differences in solids concentration between successive regions of conveying gas as they pass through the device. By adjusting the internal features of the back mixing device (number of chambers, chamber size, chamber shape, etc.), the back mixing may be optimized for a particular pneumatic control system to the point where solids flow fluctuations may be minimized. Such an improved steady flow should provide improved gasifier performance and enhanced overall carbon conversion.

It should be understood that the invention described herein applies generally to pneumatic conveying systems and is not dependent upon the equipment configurations described herein. One skilled in the art will appreciate that differently configured pneumatic conveying systems can give rise to the same sorts of solids flow rate fluctuations described herein and that the current invention can be beneficially applied to those situations as well.

It should be apparent that the foregoing relates only to certain embodiments of the present application and that numerous changes and modifications may be made herein by one of ordinary skill in the art without departing from the general spirit and scope of the invention as defined by the following claims and the equivalents thereof.

I claim:

1. A pneumatic conveying system, comprising:
   a source of coal;
   a solids feeder in communication with and positioned downstream of the source of coal;
   a high pressure feed Vessel in communication with and positioned downstream of the solids feeder;
   a flow of conveying gas in communication with the high pressure feed vessel and a bypass line for bypassing the high pressure feed vessel;
   a flow meter in communication with and positioned downstream of the high pressure feed vessel;
   a first back mixing device in communication with and positioned between the high pressure feed vessel and the flow meter;
   a gasifier in communication with and positioned downstream of the flow meter, and
   a second back mixing device in communication with and positioned between the flow meter and the gasifier.

2. The pneumatic conveying system of claim 1, wherein the solids feeder comprises a rotary, converging channel solids pressurizing and metering device.

3. The pneumatic conveying system of claim 1, wherein the high pressure feed vessel comprises a flow of a pressure controlling gas and a flow of a fluidizing gas.

4. The pneumatic conveying system of claim 1, further comprising a controller in communication with the flow meter and the solids feeder.

5. The pneumatic conveying system of claim 1, wherein the first and second back mixing devices comprise a chamber with an expanded area leading to a restriction.

6. The pneumatic conveying system of claim 1, wherein the first and second back mixing devices comprise a plurality of chambers.

* * * * *

UNITED STATES PATENT AND TRADEMARK OFFICE
CERTIFICATE OF CORRECTION

Page 1 of 1

PATENT NO.         : 8,985,912 B2
APPLICATION NO.    : 14/458492
DATED              : March 24, 2015
INVENTOR(S)        : Leininger et al.

It is certified that error appears in the above-identified patent and that said Letters Patent is hereby corrected as shown below:

In the specification

In Column 5, Line 42, delete "itself" and insert -- itself. --, therefor.

In the claims

In Column 6, Line 25, in Claim 1, delete "Vessel" and insert -- vessel --, therefor.

In Column 6, Line 27, in Claim 1, delete "of" and insert -- of a --, therefor.

In Column 6, Line 36, in Claim 1, delete "meter," and insert -- meter; --, therefor.

Signed and Sealed this
Twenty-fourth Day of November, 2015

Michelle K. Lee
*Director of the United States Patent and Trademark Office*